(12) United States Patent
Katayama et al.

(10) Patent No.: US 8,020,897 B2
(45) Date of Patent: Sep. 20, 2011

(54) JOINT STRUCTURE OF STEEL PIPE AND LIGHT METAL PIPE

(75) Inventors: Toshiyuki Katayama, Hyogo (JP); Yoshio Nakano, Hyogo (JP); Takashi Yagi, Hyogo (JP); Masamichi Matsui, Hyogo (JP)

(73) Assignee: Nichirin Co., Ltd., Kobe-shi (JP)

( * ) Notice: Subject to any disclaimer, the term of this patent is extended or adjusted under 35 U.S.C. 154(b) by 0 days.

(21) Appl. No.: 11/551,044

(22) Filed: Oct. 19, 2006

(65) Prior Publication Data

US 2008/0136176 A1 Jun. 12, 2008

(51) Int. Cl.
*F16L 33/00* (2006.01)
(52) U.S. Cl. .................. 285/256; 285/915
(58) Field of Classification Search .......... 285/382, 285/915, 256
See application file for complete search history.

(56) References Cited

U.S. PATENT DOCUMENTS

| | | | | |
|---|---|---|---|---|
| 4,281,862 A | * | 8/1981 | Ridenour | 285/382.2 |
| 4,453,301 A | * | 6/1984 | Mort et al. | 29/890.044 |
| 5,492,376 A | * | 2/1996 | Usui et al. | 285/382 |
| 5,797,629 A | * | 8/1998 | Beagle | 285/256 |

FOREIGN PATENT DOCUMENTS

| | | | | |
|---|---|---|---|---|
| JP | 63145890 A | * | 6/1988 | |
| JP | 05141577 A | * | 6/1993 | |
| JP | 06101786 A | * | 4/1994 | |
| JP | 2002195474 A | * | 7/2002 | |
| JP | 2002235876 A | * | 8/2002 | |
| JP | 2004291044 A | * | 10/2004 | |
| JP | 2005315381 A | * | 11/2005 | |

OTHER PUBLICATIONS

JP 2002195474 [machine translation] Oct. 7, 2002.*
U.S. Appl. No. 11/995,271, filed Jan. 10, 2008, Nakano, et al.

* cited by examiner

*Primary Examiner* — Aaron Dunwoody
(74) *Attorney, Agent, or Firm* — Oblon, Spivak, McClelland, Maier & Neustadt, L.L.P.

(57) ABSTRACT

A joint structure of a steel pipe and a metal pipe includes a socket; and a thermosetting resin, the steel pipe including a first joining end having a flat portion of the outer surface of the first joining end adjacent to the base, and an uneven portion of the outer surface of the first joining end adjacent to the front end, the socket covering the first joining end, the metal pipe including a second joining end, the second joining end being interposed between the socket and the first joining end, the first joining end being joined to the second joining end by crimping while the thermosetting resin is present in the gap between the inner surface of the socket and the outer surface of the second joining end and between the outer surface of the first joining end and the inner surface of the second joining end.

13 Claims, 2 Drawing Sheets

JOINT STRUCTURE OF STEEL PIPE AND LIGHT METAL PIPE

BACKGROUND OF THE INVENTION

1. Field of the Invention

The present invention relates to a technique for joining of a steel pipe and a light metal pipe. In particular, the present invention relates to the joint structure of a vibration-absorbing hose used for the refrigerant circuit of a mobile air conditioning.

2. Description of the Related Art

Aluminum alloy pipes have recently been used in piping of refrigerant circuits of mobile air conditioning systems to reduce the weight of automotive bodies. Vibrations due to a compressor or the like may produce resonance of the piping so as to cause noise. Thus, composite hoses each formed of rubber and a resin have conventionally been incorporated in the middle of the piping in order to suppress resonance of the piping.

HFC 134a has been used in place of chlorofluorocarbons, which are ozone-destroying substances, as a refrigerant for mobile air conditioning systems. HFC 134a has an ozone depletion potential of zero but has high global warming potential to cause an increase in global warming. Thus, a $CO_2$ refrigerant is recommended as an alternative to HFC 134a because $CO_2$ has low global warming potential and is a naturally existing material.

However, in the use of the $CO_2$ refrigerant, the refrigerant circuit piping needs to have a heat resistant temperature of 140° C. to 180° C. as compared with 120° C. to 140° C. in using the HFC 134a refrigerant. Furthermore, the refrigerant circuit piping using the $CO_2$ refrigerant needs to have a discharge pressure of 13 to 15 MPa as compared with 1.7 to 1.8 MPa in using the HFC 134a refrigerant.

Known composite hoses each formed of rubber and a resin do not withstand such high-temperature, high-pressure conditions. Thus, Japanese Unexamined Patent Application Publication No. 2002-195474 (Patent Document 1) discloses a vibration-absorbing hose having a stainless-steel bellows in place of the known composite hoses. The stainless-steel vibration-absorbing hose has a metal hose wall and has thus significantly low gas permeability compared with known composite hoses each formed of rubber and a resin; hence, there is no leakage of the refrigerant from the stainless-steel hose. Thus, the stainless-steel vibration-absorbing hose is used for not only the $CO_2$ refrigerant but also the current HFC 134a refrigerant and the like in order to bring the amount of leakage of the refrigerant to the exterior closer to zero.

However, when the vibration-absorbing hose is incorporate in the refrigerant circuit, there are the following problems: under the present circumstances, the bellows of the vibration-absorbing hose must be composed of stainless steel only in view of processability and strength. On the other hand, the refrigerant circuit piping needs to be composed of aluminum or an aluminum alloy in view of a reduction in the weight of an automotive body and costs; hence, it is difficult to change the material from aluminum to stainless steel. Thus, the stainless-steel vibration-absorbing hose needs to be connected with the aluminum piping. However, it is significantly difficult to achieve a reliable joint with high strength and high hermeticity by only mechanically fitting or screwing these metal pipes. Furthermore, joining of an aluminum component with a stainless-steel component by welding or brazing to form a joint easily forms a brittle intermetallic compound in the joint. Hence, also in this case, it is significantly difficult to achieve a reliable joint with high strength and high hermeticity.

Japanese Unexamined Patent Application Publication No. 7-310161 (Patent Document 2) discloses a method for joining a steel component to an aluminum component, the method including roughening a surface of the steel component to form irregularities; then, temporarily forming an aluminum layer; and thus forming a diffusion layer composed of a Fe—Al intermetallic compound by radio-frequency heating while pressing the aluminum layer from the surface side.

However, the method disclosed therein aims to improve abrasive resistance and smoothness of the surface of the steel component by forming the diffusion layer composed of the intermetallic compound. As long as the intermetallic compound is formed, a reliable joint with high strength and high hermeticity is not obtained.

SUMMARY OF THE INVENTION

The present invention was accomplished in light of the above-noted problems. It is an object of the present invention to provide a joint structure of pipes composed of different metals, for example, a steel pipe such as a stainless-steel pipe and a light metal pipe such as an aluminum pipe, the joint structure having satisfactory strength and hermeticity and being capable of being relatively easily produced.

The present invention serves to overcome the above-noted problems. A brief summary of features of the present invention will be described below.

(1) According to an aspect of the present invention, a joint structure of a steel pipe and a light metal pipe, includes a socket and a thermosetting resin, the steel pipe including a first joining end having a flat portion of the outer surface of the first joining end adjacent to the base of the steel pipe, and an uneven portion of the outer surface of the first joining end adjacent to the front end of the steel pipe, the socket covering the first joining end, the light metal pipe including a second joining end, the second joining end being interposed between the socket and the first joining end, the first joining end being joined to the second joining end by crimping while the thermosetting resin is present in the gap between the inner surface of the socket and the outer surface of the second joining end and in the gap between the outer surface of the first joining end and the inner surface of the second joining end.

(2) In the joint structure of a steel pipe and a light metal pipe described in item (1), the thermosetting resin has a glass transition temperature of 140° C. or higher.

(3) In the joint structure of a steel pipe and a light metal pipe described in item (1) or (2), the thermosetting resin is present in the gap between the inner surface of the socket and the outer surface of the second joining end and in the gap between the flat portion and the inner surface of the second joining end.

(4) In the joint structure of a steel pipe and a light metal pipe described in any one of items (1) to (3), the thermosetting resin is an epoxy resin.

(5) In the joint structure of a steel pipe and a light metal pipe described in any one of items (1) to (4), the steel pipe is a stainless-steel pipe, and the light metal pipe is an aluminum pipe.

(6) In the joint structure of a steel pipe and a light metal pipe described in any one of items (1) to (5), the first joining end is joined to the second joining end by crimping at three positions along the first and second joining ends in the longitudinal direction.

DESCRIPTION OF THE PREFERRED EMBODIMENTS

Embodiments of the present invention will be described in detail below with reference to the drawings.

Figure 1:
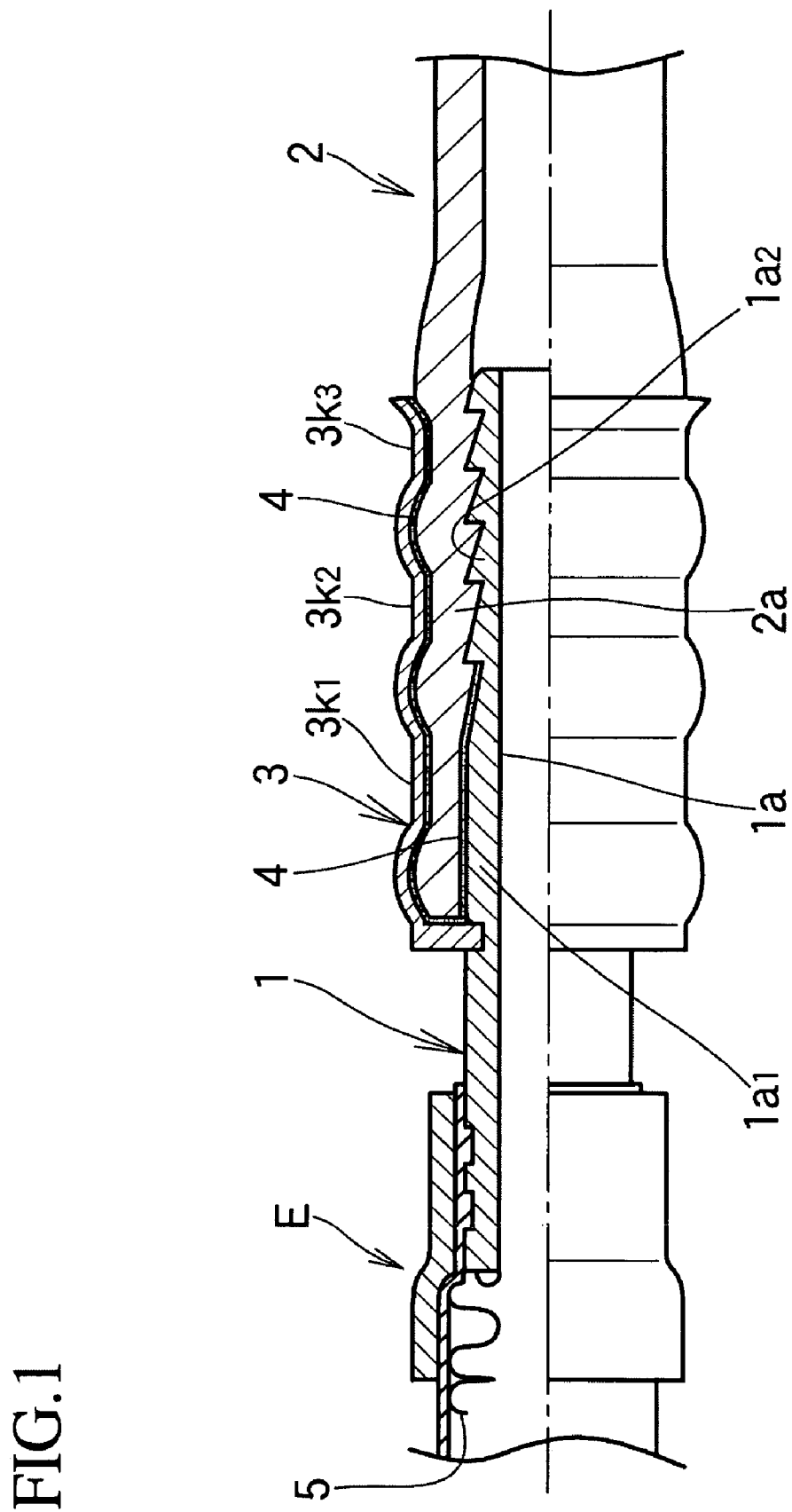
FIG. 1 is a fragmentary longitudinal sectional view of a joint structure of a stainless-steel pipe and an aluminum-alloy pipe according to a first embodiment of the present invention.
Figure 2:
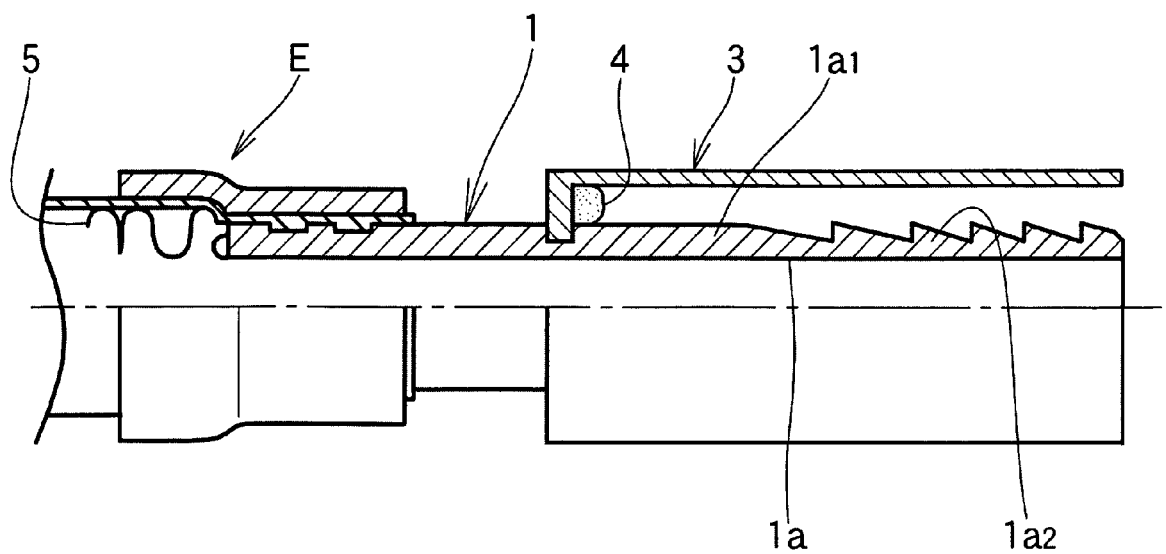
FIG. 2 is a fragmentary longitudinal sectional view of the structure of a stainless-steel pipe side according to an embodiment of the present invention.
Figure 3:
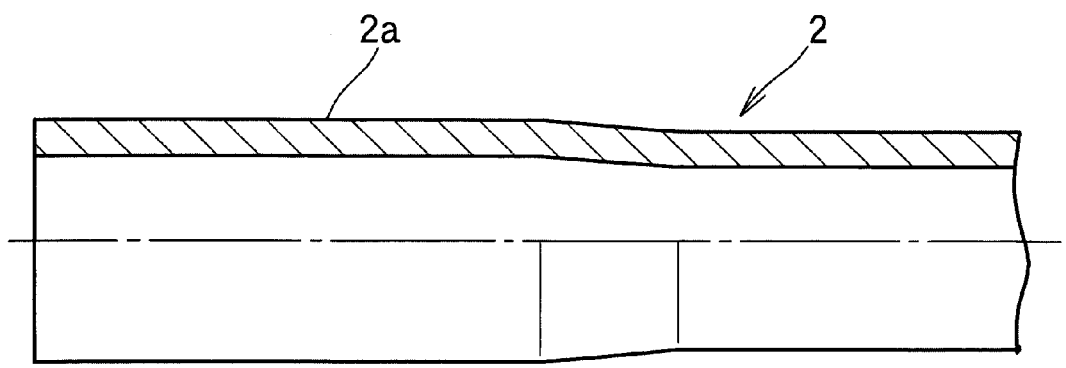
FIG. 3 is a fragmentary longitudinal sectional view of the structure of an aluminum pipe side according to a third embodiment of the present invention.

FIG. 1 shows a typical embodiment of the present invention and shows a preferred joint structure of a stainless-steel pipe and an aluminum-alloy pipe, the joint structure being incorporated in the middle of the $CO_2$ refrigerant circuit piping of a. FIGS. 2 and 3 each show a stainless-steel pipe side and an aluminum-alloy pipe side before joining them.

The present invention including a process for producing a final joint structure will be described on the basis of FIGS. 2 and 3. As shown in FIG. 2, a stainless-steel pipe side includes a stainless-steel bellows 5 having an accordion structure in the middle of the bellows 5; stainless-steel nipples, i.e., stainless-steel pipes 1, each fixed at each end of the bellows 5 by brazing or welding; and a vibration-absorbing hose E connecting the stainless-steel pipe 1 and the bellows 5. In the figures, only one nipple for connection with the aluminum-alloy pipe is indicated, and the other is omitted.

The outer surface of a first joining end $1a$ of the stainless-steel pipe 1 disposed at a joining side includes a flat portion $1a1$ adjacent to a base side; and an uneven portion $1a2$ adjacent to a front side. The uneven portion $1a2$ has a sawtooth form in cross-section, the sawtooth form having alternately arranged inclined sections tapering toward the front side and perpendicular sections. Furthermore, a stainless-steel socket 3 is integrally fixed to the stainless-steel pipe 1 by brazing, welding, such as laser welding, or crimping so as to cover the outer surface of the first joining end $1a$.

A moderate amount of thermosetting epoxy resin 4 having a glass transition temperature (Tg) of 140° C. or higher is charged into the innermost portion in the socket 3 using an injector, such as a syringe.

As shown in FIG. 3, the aluminum-alloy pipe side includes a second joining end $2a$ adjacent to the joint side of an aluminum-alloy pipe 2, the second joining end $2a$ having a slightly increased diameter in order to be inserted to the socket 3 of the stainless-steel pipe side.

In joining the stainless-steel pipe 1 and the aluminum-alloy pipe 2, the aluminum-alloy pipe 2 is inserted to the socket 3 of the stainless-steel pipe 1 until the leading end of the second joining end $2a$ of the aluminum-alloy pipe 2 is in contact with the innermost portion of the socket 3, thereby loosely fitting the joining ends of both pipes.

Then, the first joining end $1a$ is joined to the second joining end $2a$ by crimping the outer surface of the socket 3 at three positions (three crimps) of with a crimping machine.

FIG. 1 shows a joint structure of the stainless-steel pipe 1 and the aluminum-alloy pipe 2 after crimping. Three crimped portions $3k1$ to $3k3$ (three crimps) are formed on the outer surface of the socket 3. The second joining end $2a$ of the soft aluminum-alloy pipe 2 undergoes plastic deformation by crimping in accordance with the shapes of the inner surface of the hard socket 3 and the outer surface of the hard first joining end $1a$ and is brought into close contact with them.

At the same time, by crimping, the epoxy resin 4 disposed at the innermost portion of the socket 3 flows and penetrates into the entire gap between the inner surface of the socket 3 and the second joining end $2a$ of the aluminum-alloy pipe 2 and into the entire gap between the flat portion $1a1$ of the first joining end $1a$ of the stainless-steel pipe 1 and the second joining end $2a$ of the aluminum-alloy pipe 2.

After crimping, the resulting joint is heated at 140° C. to 180° C. to cure the epoxy resin with which the gaps are filled, thus forming a resin film having high adhesion between stainless-steel and an aluminum alloy. Thereby, an inventive joint structure of the stainless-steel pipe 1 and the aluminum-alloy pipe 2 is completed.

The resulting joint structure of the present invention has a strong, integral structure in which the stainless-steel socket is fixed on the stainless-steel pipe (nipple) by crimping and in which the inner surface of the second joining end of the aluminum-alloy pipe is engaged in the outer surface of the first joining end of the stainless-steel pipe with the uneven portion having the sawtooth form by crimping at three positions. Furthermore, since the inner surface of the second joining end of the aluminum-alloy pipe is bonded to the outer surface of the first joining end of the stainless-steel pipe with the thermosetting resin (epoxy resin) having a glass transition temperature of 140° C. or higher, the joint structure has satisfactory strength against the axial load of the pipe and torsional torque. Furthermore, the joint structure does not rupture under tension at high temperatures.

Furthermore, since the gap between the joining ends of both pipes and the gap between the socket and the second joining end of the aluminum-alloy pipe are uniformly penetrated, filled and bonded with the thin cured resin film having a thickness of 0.001 to 0.5 mm, the joint structure has significantly high hermeticity.

It is important and essential for the present invention to dispose the thermoplastic resin (adhesive) having a glass transition temperature of 140° C. or higher in the gap between the inner surface of the socket and the outer surface of the second joining end of the aluminum-alloy pipe and the gap between the outer surface of the first joining end of the stainless-steel pipe and the inner surface of the second joining end of the aluminum-alloy pipe. The thermosetting resin is not necessarily disposed in the entire gaps but may be partially disposed in each gap.

The presence of the thermosetting resin (film) between the stainless-steel components and the aluminum-alloy pipe results in a joint structure having satisfactory strength and hermeticity in particular at high temperatures (140° C. or higher) as stated above. In this case, as the above-described embodiment, it is particularly preferred that the thermosetting resin be disposed in the entire gap between the inner surface of the socket and the outer surface of the second joining end of the aluminum-alloy pipe and the gap between the flat portion of the outer surface of the first joining end of the stainless-steel pipe and the inner surface of the second joining end of the aluminum-alloy pipe.

Typical examples of the thermosetting resin used in the present invention include epoxy resins and polyimide resins. Examples of the epoxy resin include alicyclic epoxy resins, glycidyl ether epoxy resins, glycidyl ester epoxy resins, and glycidyl amine epoxy resins. Examples of the alicyclic epoxy resin include alicyclic diepoxy acetal, alicyclic diepoxy adipate, alicyclic diepoxy carboxylate, and vinylcyclohexene dioxide. Examples of the polyimide resin include pyromellitic dianhydride (PMDA), biphenyl tetracarboxylic dianhydride (BPDA), and benzophenone tetracarboxylic dianhydride (BTDA).

Among these known thermosetting resins, any one of the resins each having a glass transition temperature of 140° C. or higher and preferably 160° C. or higher may be used as the adhesive.

A method for charging the thermosetting resin into the gaps is not limited to a method of charging a liquid material into the innermost portion of the socket with a syringe in advance as the embodiment. For example, a method for applying a liquid resin to the outer and inner surfaces of the second joining end of the aluminum-alloy pipe, the outer surface of the first joining end of the stainless-steel pipe, or the inner surface of the socket in advance may be employed. Alternatively, a method for covering one of these with a solid film may be employed. In view of processability, since the method for using the syringe described in the embodiment is practical and easy, this method is particularly preferred.

A method for crimping pipes at three positions is employed in the above-described embodiment but is not limited thereto. A method for crimping pipes at a single position or at two positions may be employed. According to experiments conducted by the inventor, a method for crimping pipes at three positions is the most excellent in view of flow of the resin into the gaps and the permanent set of the stainless-steel pipe; hence, this method is more preferred.

Example

In order to verify the effect of the present invention, a joint including a joint structure corresponding to the above-described embodiment was produced. A bellows shown in FIG. 1 was omitted. A joint of a nipple (stainless-steel pipe) alone and aluminum-alloy pipe was used as a test sample.

The nipple having an outer diameter of 8 mm, an inner diameter of 5.6 mm, and a length of 50 mm and composed of SUS 304 was used. A joining end having a length of 20 mm was defined in the nipple. Irregularities having a sawtooth form in cross-section were formed on the outer surface of a region 15 mm from the end by mechanical processing. A pipe having an outer diameter of 13.5 mm and an inner diameter of 12 mm and composed of SUS 304 was used as a socket. The socket was fixed to the base of the nipple by crimping in such a manner that the entire joining end of the nipple is was covered with the socket at a predetermined distance away from each other.

An aluminum-alloy pipe having enlarged diameters, i.e., having an outer diameter 11.6 mm, an inner diameter of 8 mm, and a length of 20.5 mm and composed of A3005 was used.

The nipple was placed in such a manner that the opening of the socket faced upward. An epoxy resin (trade name: 2285, manufactured by Three Bond Co., Ltd.) having a glass transition temperature of 180° C. was uniformly injected into the circumference of the innermost portion (bottom) of the socket.

The aluminum-alloy pipe was inserted into the socket through the opening until the pipe was in contact with the innermost portion, thereby loosely fitting the pipes so that the joining ends of the pipes overlapped each other.

The socket was press-bonded by crimping at three positions with a crimping machine, thereby integrally connecting the joining ends of the nipple, i.e., stainless-steel pipe, and the aluminum-alloy pipe.

The resulting joint was subjected to heat treatment at 150° C. for 30 minutes to cure the epoxy resin (film) charged into the gaps between the joining ends.

The resulting joint of the stainless-steel pipe and the aluminum-alloy pipe was used as a test sample. An airtightness test after a thermal-shock test, pressure test after the thermal-shock test, a pressure-cycling endurance test, and a gas-permeability test were performed. A comparative joint was produced in the same way in Example, except that the epoxy resin was not used.

The outlines of the tests were described below. Table 1 shows the test results.

(1) Airtightness testing after thermal-shock test: A test sample was placed in a test chamber. After a cycle in which a test sample was heated at 180° C. for 1 hour and then cooled at −40° C. for 1 hour was repeated 20 times to perform a thermal-shock test, the test sample was immersed in water and pressurized at 15 MPa with nitrogen gas. The test sample was examined for gas leakage from the joint by checking the generation of bubbles.

(2) Pressure testing after the thermal-shock test: after performing the thermal-shock test, a test sample was checked for failure, such as leakage from the joint, rupture, or disconnection, while applying a water pressure of 40 MPa.

(3) Pressure-cycling endurance test: The temperature of oil and an atmosphere was set at 150° C. Pulses with a pulse repetition rate of 30 to 50 per minute were applied to a test sample at a pressure of 0 and 22.5 MPa using an impulse testing machine. The test sample was checked for failure, such as leakage from the joint, rupture, or disconnection, (4) Gas-permeability testing: Carbon dioxide gas was charged into the test sample at an atmospheric temperature of 150° C. The amount of gas permeated after 600 hours was determined by measuring a change in weight.

Table 1 summarizes the test results.

TABLE 1

| Test | Test sample | Results |
| --- | --- | --- |
| A. Airtightness test after thermal-shock test | Example | No gas leak |
| | Comparative example | Gas leak at 0.5 MPa |
| B. Pressure test after the thermal-shock test | Example | No failure |
| | Comparative example | Gas leak at 0.5 MPa |
| C. Pressure-cycling endurance test | Example | No rupture, disconnection, or oil leak after 200,000 cycles |
| | Comparative example | Oil leak at 5,000 cycles |
| D. Gas-permeability test | Example | Impermeable |
| | Comparative example | Gas leak after 168 hours |

From the results of Table 1, no failure was observed in the present invention (Example). It is clear that the joint of the present invention has excellent joint strength and hermeticity.

Joints produced using three thermosetting resin adhesives having glass transition temperatures of 120° C., 140° C., and 180° C. in the same way were used as test samples. The test samples were subjected to a rotary torque test in a high-temperature atmosphere. This test was performed as follows: the test sample was placed in a constant-temperature bath for 30 minutes and then taken out. Immediately, the test sample was horizontally fixed. The stainless-steel nipple was rotated with a torque wrench. A torque value when the nipple started moving was measured.

Table 2 shows the test results.

TABLE 2

| Tg | Ambient temperature | | | |
|---|---|---|---|---|
|  | RT | 120° C. | 140° C. | 160° C. |
| 180° C. | 30 N · m | 30 N · m | 30 N · m | 30 N · m |
| 140° C. | 30 N · m | 30 N · m | 23 N · m | 13 N · m |
| 120° C. | 30 N · m | 22 N · m | 12 N · m | 8 N · m |

Table 2 shows as follows: At room temperature (RT), when the Tg of the resin was changed, the rotary torque was not changed. The effect of Tg was observed with increasing ambient temperature. In particular, in a high-temperature atmosphere with a temperature of 140° C. or higher, the rotary torque in the joint including the resin having a Tg of 140° C. or higher is greater than that in the resin having a Tg of 120° C. That is, the joint of the present invention had more satisfactory joint strength against rotary torque at high temperatures.

What is claimed is:

1. A joint structure of a steel pipe and a metal pipe, comprising:
   a socket integrally fixed to said steel pipe at a face substantially perpendicular to an axis of the steel pipe; and
   an epoxy resin or polyimide resin having a glass transition temperature of 140° C. or higher,
   the steel pipe including a joining end including
      a flat portion on an outer surface of the joining end adjacent to a base of said steel pipe, and
      an uneven portion of the outer surface of the joining end adjacent to a front end of said steel pipe,
   the socket covering the joining end of said steel pipe,
   the metal pipe including a joining end,
   the metal pipe joining end being interposed between the socket and the joining end of said steel pipe,
   wherein the joining end of said steel pipe is joined to the joining end of said metal pipe at a crimped portion, and
   wherein the epoxy resin or the polyimide resin is located between an inner surface of the socket and an outer surface of the joining end of said metal pipe and located between the outer surface of the joining end of said steel pipe and an inner surface of the joining end of said metal pipe.

2. The joint structure according to claim 1, wherein the epoxy resin or the polyimide resin is present along the entire inner surface of the socket and along the entire outer flat portion of the joining end of the steel pipe.

3. The joint structure according to claim 1, wherein said steel pipe comprises a stainless-steel pipe, and the metal pipe comprises an aluminum pipe.

4. The joint structure according to claim 1, wherein the joining end of said steel pipe is joined to the joining end of said metal pipe at three crimped positions along the joining ends of said steel pipe and said metal pipe in a longitudinal direction.

5. The joint structure according to claim 1, wherein the socket is integrally fixed to the steel pipe by brazing, welding, or crimping.

6. The joining structure according to claim 1, wherein said steel pipe includes a stainless-steel bellows disposed at an opposite side of said joining end of said steel pipe, said stainless-steel bellows including an accordion structure in a middle portion.

7. The joining structure according to claim 6, wherein an inner surface of said stainless-steel bellows contacts an outer surface of said opposite side of said steel pipe.

8. The joining structure according to claim 7, wherein a vibration-absorbing hose is disposed at said opposite side of said steel pipe, and an inner surface of said vibration-absorbing hose contacts an outer surface of said stainless-steel bellows.

9. The joint structure according to claim 8, wherein the epoxy resin or the polyimide resin is present along the entire inner surface of the socket and along the entire outer flat portion of the joining end of the steel pipe.

10. The joint structure according to claim 8, wherein said steel pipe comprises a stainless-steel pipe, and the metal pipe comprises an aluminum pipe.

11. The joint structure according to claim 8, wherein the joining end of said steel pipe is joined to the joining end of said metal pipe at three crimped positions along the joining ends of said steel pipe and said metal pipe in a longitudinal direction.

12. The joint structure according to claim 8, wherein the socket is integrally fixed to the steel pipe by brazing, welding, or crimping.

13. The joint structure according to claim 1, wherein the uneven portion of the outer surface of the joining end has a saw-tooth form in cross-section, the saw-tooth form having alternately arranged inclined sections tapering toward a front side and perpendicular sections.

* * * * *